UNITED STATES PATENT OFFICE.

FERDINAND CHRISTOPH VON HEYDEBRAND UND DER LASA, OF NEW YORK, N. Y.

ARTIFICIAL FUEL.

SPECIFICATION forming part of Letters Patent No. 684,546, dated October 15, 1901.

Application filed December 10, 1900. Serial No. 39,413. (No specimens.)

*To all whom it may concern:*

Be it known that I, FERDINAND CHRISTOPH VON HEYDEBRAND UND DER LASA, a citizen of the United States, and a resident of New York city, State of New York, have invented certain new and useful Improvements in Artificial Fuel, of which the following is a specification.

The object of this invention is to produce the smokeless recombustible fuel in which earth and carbon are combined with certain chemicals and which fuel may be reburned several times.

The invention consists of compounding earth, including rock, with carbon, such as coal-dust preferably, sulfuric acid diluted with water, sulfur, and lime or solid products of lime, such as chlorid of lime or carbonate of lime, sulfate of iron, pyrites, sulfate of magnesium, and sulfate of soda, which are thoroughly pulverized and mixed, caking of the compound into suitable-sized pieces to correspond with the several grades of ordinary coal.

My invention employs such a mixture of earth and carbon (which includes carbonaceous material, of course) as by its rational compounding with certain chemicals burns without smoke and is recombustible, a result never heretofore known.

The relative proportions of the ingredients of my smokeless recombustible composition may be varied more or less. I therefore would not limit the amount of the several ingredients which I employ or compound.

The sulfuric acid I employ (which I dilute with a large percentage of water) is used in very small quantities and with the earth and carbon forms the principal ingredients, as I can produce a good fuel with them alone; but such a compound does not burn with such brilliancy or heat as when I employ a very small amount of some or all of the following chemicals: sulfur, sulfate of magnesium, iron pyrites, sulfate of soda and sulfate of iron with lime or solid products of lime, such as chlorid of lime or carbonate of lime, which is employed as a binder. These several ingredients are in the following proportions: earth, twelve hundred pounds per ton; carbonaceous matter, (preferably coal-dust,) five hundred and thirty-five pounds per ton; sulfur or sulfuric acid, twenty pounds per ton; sulfate of magnesium, twenty-eight pounds per ton; sulfate of soda, fourteen pounds per ton; lime or solid products of lime, one hundred and seventy-five pounds per ton, and sulfate of iron or pyrites, twenty-eight pounds per ton. These are placed in one common receptacle and thoroughly mixed by an ordinary agitator or mixing apparatus. The compound is then pressed into suitable pieces best adapted for commercial use. It is then dried by natural action of the air or by artificial heat.

In compressing this fuel any ordinary brick-machine may be employed. It can be made with any kind of earth, to which carbon and sulfur are added in about the described proportions, in the open air, and under all suitable conditions.

This smokeless recombustible artificial fuel is ignited the same as ordinary coal by the aid of wood or any combustible or kindling material.

By careful experiments in combining the earth, carbon, and chemicals I have succeeded in making this fuel free from smoke, sparks, clinkers, cinders, fine ash, or dust, such as is left after burning coal or coke. It is clean to handle, does not lose any of its heat qualities by age or exposure to weather, no spontaneous combustion can occur, and substantially there are no obnoxious gases emitted before or while burning.

After this smokeless fuel has been burned once, and thereby the combustible properties apparently exhausted, it can be reburned without adding any new material thereto.

While I have named certain chemicals to be compounded with the earth and carbon as necessary to produce the fuel, I can also employ instead of the named chemicals many equivalents, such as nitric or muriatic acid. I may dispense with sulfuric acid and substitute between one and two per cent. of sulfur or iron pyrites or other pyrites for the sulfuric acid. Instead of diluting the sulfuric acid with water I may use a weak solution of sulfuric acid, as the addition of water to the sulfuric acid of commerce is to be distinguished from the production of a weak acid in the original manufacturing process of the acid.

Having thus fully described my invention or discovery, what I claim, and desire to secure by Letters Patent of the United States, is—

1. A composition of matter for smokeless recombustible artificial fuel consisting of earth, carbon, sulfur, lime and a binder.

2. A composition of matter for smokeless recombustible artificial fuel, consisting of earth, carbon and sulfur in proportions substantially as described.

3. A composition of matter containing carbon for a smokeless artificial fuel which, after the apparent exhaustion of its combustible properties as a fuel in a fire, may be subsequently rekindled, or added to a going fire and be reburned without any retreatment of the said composition.

FERDINAND CHRISTOPH VON
 HEYDEBRAND UND DER LASA. [L. S.]

Witnesses:
 J. LE MON,
 T. H. RIBANKS.